US009218551B2

(12) United States Patent
  Ji

(10) Patent No.: US 9,218,551 B2
(45) Date of Patent: Dec. 22, 2015

(54) METHOD AND DEVICE FOR RASTERIZING PAGE DIGITAL IMAGE

(75) Inventor: Yong Ji, Beijing (CN)

(73) Assignees: PEKING UNIVERSITY FOUNDER GROUP CO., LTD., Beijing (CN); PEKING UNIVERSITY FOUNDER R & D CENTER, Beijing (CN); BEIJING FOUNDER ELECTRONIC CO., LTD., Beijing (CN)

( * ) Notice: Subject to any disclaimer, the term of this patent is extended or adjusted under 35 U.S.C. 154(b) by 148 days.

(21) Appl. No.: 13/997,116

(22) PCT Filed: Dec. 21, 2011

(86) PCT No.: PCT/CN2011/084382
  § 371 (c)(1),
  (2), (4) Date: Oct. 15, 2013

(87) PCT Pub. No.: WO2012/083857
  PCT Pub. Date: Jun. 28, 2012

(65) Prior Publication Data
  US 2014/0043639 A1   Feb. 13, 2014

(30) Foreign Application Priority Data
  Dec. 21, 2010   (CN) .......................... 2010 1 0614316

(51) Int. Cl.
  *G06K 15/02*   (2006.01)
  *G06T 11/40*   (2006.01)
(52) U.S. Cl.
  CPC ............ *G06K 15/1836* (2013.01); *G06T 11/40* (2013.01)
(58) Field of Classification Search
  None
  See application file for complete search history.

(56) References Cited

U.S. PATENT DOCUMENTS

| 6,600,569 | B1 * | 7/2003 | Osada et al. | ................. | 358/1.12 |
| 2004/0196483 | A1 * | 10/2004 | Jacobsen | ..................... | 358/1.13 |
| 2009/0103139 | A1 * | 4/2009 | Ozawa | ........................... | 358/2.1 |
| 2009/0244622 | A1 * | 10/2009 | Maresch | ..................... | 358/1.16 |

FOREIGN PATENT DOCUMENTS

| CN | 101044508 A | 9/2007 |
| CN | 101833430 A | 9/2010 |

OTHER PUBLICATIONS

Application No. PCT/CN2011/084382 English Translation of the International Search Report mailed Mar. 22, 2012; 2 pages.
Application No. PCT/CN2011/084382 English Translation of the Written Opinion of the International Search Authority mailed Mar. 22, 2012; 5 pages.
European Application No. 11851657.4, Communication pursuant to Article 94(3) EPC dated Jun. 26, 2015, 4 pages.
Adobe Systems Incorporated "PostScript language reference, Chapter 4 (Graphics)", 1999, Addison-Welsley, pp. 175-311.

* cited by examiner

*Primary Examiner* — Thomas D Lee
(74) *Attorney, Agent, or Firm* — Lathrop & Gage LLP

(57) ABSTRACT

The application discloses a method and an apparatus for rasterizing a page digital image. The method comprises steps of parsing a page digital image to obtain basic information, position information and rasterization information of the image, with the basic information including image data, image type, a width, height and bit depth of the image (S10); decoding data encoding type to obtain the image data and saving the image data into a buffer (S20); acquiring the image data from the buffer and rasterizing the image data by using the image type, the width, height and bit depth of the image and the position information to obtain a rasterized page lattice (S30). The solution may reduce the reading and writing operations for data files on disk and improve the rasterization efficiency of the digital image.

12 Claims, 4 Drawing Sheets

METHOD AND DEVICE FOR RASTERIZING PAGE DIGITAL IMAGE

CROSS REFERENCE TO RELATED APPLICATIONS

This application is a 35 USC §371 National Stage application of International Application No. PCT/CN2011/084382 filed Dec. 21, 2011, which claims the benefit of priority to China Patent Application No. 201010614316.1 filed Dec. 21, 2010. The disclosure of each of the prior applications is considered part of and is incorporated by reference in the disclosure of this application.

TECHNICAL FIELD

The present application relates to the field of digital typesetting, in particular, to methods and apparatuses for rasterizing a digital image on a page (hereafter, page digital image).

BACKGROUND

The digital image described by page description language may be interpreted and generated as actual page lattice data according to description of the image for storage or for a back-end output device to print and phototypeset etc., which is referred to as rasterization of the page digital image. The rasterization is a series of procedures including: parsing the original information such as width, height and bit depth etc.; processing the color of the image; processing transfer curves; and processing geometric transformation etc. After these procedures, the image is transferred from a user coordinate space to a device coordinate space, and the image is set to the page lattice of the device and thus the rasterization is done.

Since the conventional rasterization of the digital image results in higher output resolution and huge image, which occupy a lot of computer resources, intermediate files of image data (hereafter, image data intermediate files) needs to be often used. As shown in FIG. 1, the rasterizing process of the digital image may include steps of parsing the image data by an image data decoder and storing the image data in the image data intermediate files; and reading the data from the intermediate files by an image rasterizing processor and generating a final rasterized image lattice after processing the data.

The inventor recognized that the rasterization of the digital image has the following disadvantages: it needs to read from and write to disks for all the digital image data; and the color processor, Decode processor, the transfer curve processor and the image geometric transformation processor all read the image data intermediate files. Therefore, the amount of data to be read from and written to disks will increase a multiple of the square. In particular, in the case that the output resolution is relatively high, the operation with the huge amount of data seriously reduces processing efficiency. With improvement of operating efficiency of the back-end printing device, the rasterizing process becomes increasingly incompetent.

SUMMARY

The present application seeks to provide a method and an apparatus for rasterizing a page digital image to solve the problem of frequent reading of the storage disk and the associated low efficiency in the prior art.

According to one embodiment of the present application, a method for rasterizing a page digital image is provided. The method may include a step of parsing a page digital image to obtain basic information, position information and rasterization information of the image, with the basic information including image data, image type, a width, height and bit depth of the image. In addition, the method may include a step of decoding data encoding type to obtain the image data and saving the image data into a buffer and a step of acquiring the image data from the buffer and rasterizing the image data by using the image type, the width, height and bit depth of the image and the position information to obtain a rasterized page lattice.

According to another embodiment of the present application, an apparatus for rasterizing a page digital image is provided. The apparatus may include an image parameter parser configured to parse a page digital image to obtain basic information, position information and rasterization information of the image, with the basic information including image data, image type, a width, height and bit depth of the image. Furthermore, the apparatus may include an image data decoder configured to decode data encoding type to obtain the image data and saving the image data into a buffer. In addition, the apparatus may include an image rasterizing processor configured to acquire the image data from the buffer and rasterize the image data by using the image type, the width, height and bit depth of the image and the position information to obtain a rasterized page lattice.

The methods and the apparatuses for rasterizing a page digital image according to embodiments of the present application will no longer require writing the data into the intermediate files in order to solve the problem of frequently reading the disk which causes a low efficiency as in the prior art. Additionally, the methods and apparatuses according to embodiments of the present application reduce the reading and writing operations to the disk data and substantially increase the efficiency of the digital image rasterizing process.

BRIEF DESCRIPTION OF THE DRAWINGS

The drawings described herein are used to provide a further understanding to the present application and constitute a part of this specification. Exemplary embodiments of the present application and their descriptions serve to explain the present application and do not constitute improper limitation on the present application. In the drawings.

DETAILED DESCRIPTION

Hereinafter, the methods and apparatuses of the present application will be explained in detail with reference to the accompanying drawings in connection with the embodiments.

Figure 1:
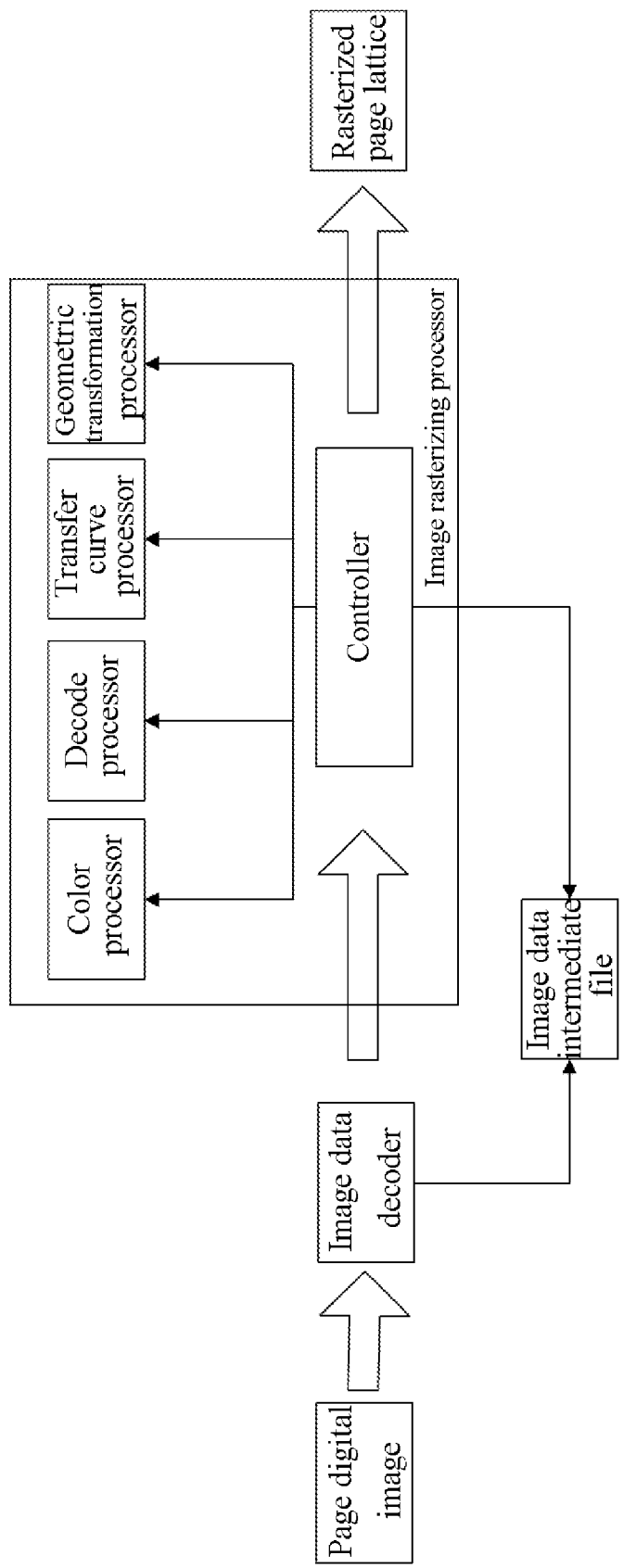
FIG. 1 is a schematic diagram of an apparatus for rasterizing a page digital image as in the prior art.
Figure 2:
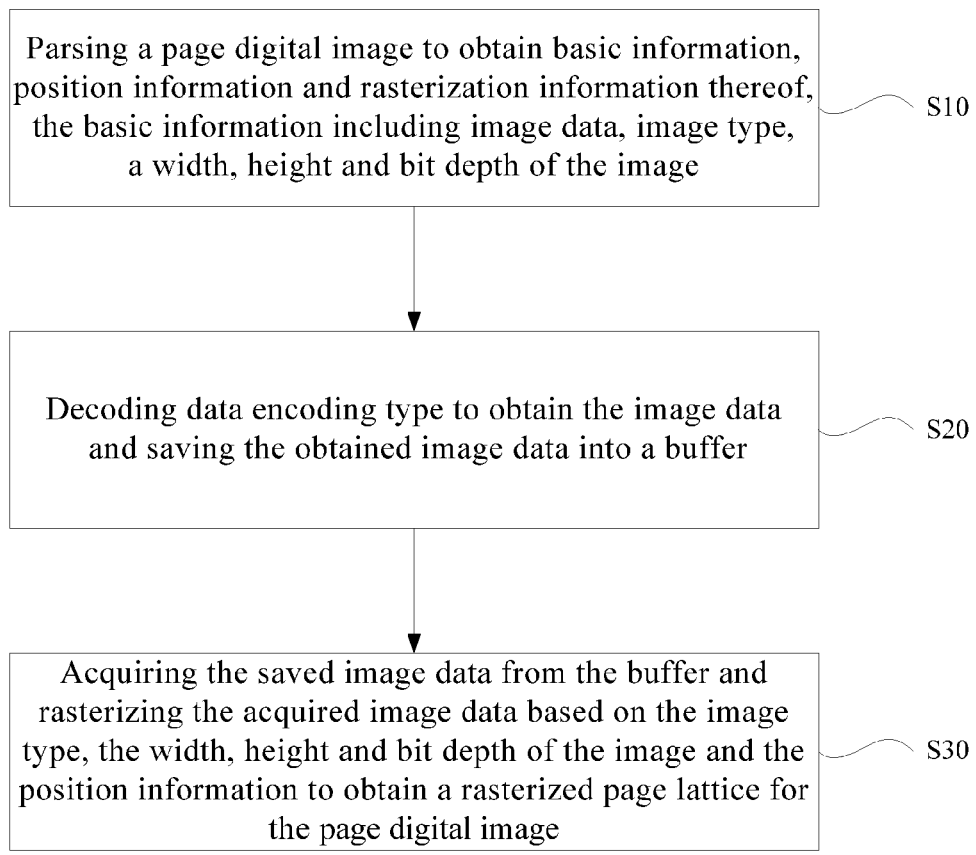
FIG. 2 is a flowchart illustrating a method for rasterizing a page digital image according to an embodiment of the present application.

FIG. 2 is a flowchart illustrating a method for rasterizing a page digital image according to an embodiment of the present application. The method in the embodiment of FIG. 1 includes a step S10, in which a page digital image is parsed to obtain basic information, position information and rasterization information of the image. The basic information may include image data, image type, a width, height and bit depth of the image; a step S20, in which a data encoding type for the image is decoded to obtain the image data and then the obtained image data is stored into a buffer; a step S30, in which the image data is acquired from the buffer and the image data is rasterized by using the image type, the width, height and bit depth of the image and the position information to obtain a rasterized page lattice.

In the prior art, the image data are written into the image data intermediate files, and thus there is a need to read from and write to disks for all the digital image data. However, according to the embodiment of the present application, parameters can be resolved and then a part of the resolved parameters for the rasterizing process can be directly sent to the image rasterizing processor, and only the image data is saved in the buffer. The buffer can use computer memory to buffer the image data without reading and writing operations to disk data files. After the buffered image data are processed, the buffer is released. Therefore, the method according to the present application reduces the reading and writing operations to the disk data files during the digital image rasterizing process and substantially increases the efficiency of the digital image rasterizing process.

Preferably, the step of saving the decoded image data into a buffer includes a step of rotating the image data or processing (mirroring) a scanning order of the image data such that the image data is consistent with the rasterized page lattice and a step of saving the rotated or mirrored image data to the buffer. Thus, there is a need to carry out necessary pretreatments before buffering the image data. The pretreatments mainly refer to the geometric transformation of the image data such as image rotation or mirroring etc., but do not contain the zooming. A preferable embodiment consistent with the present disclosure can further increase the efficiency of the rasterizing process.

Preferably, the basic information of the image may further include Decode parameters, and the step of rasterizing the image data includes a step of decoding the image data based on the Decode parameters. According to a preferable embodiment consistent with the present disclosure, Decode parameters can be directly parsed without being written to the image data intermediate files. Therefore, the disk operation can be reduced to increase the processing efficiency.

Preferably, the basic information of the image may further include color type, and the step of rasterizing the image data includes a step of converting a color space of the Decode-processed image data with the color type. According to a preferable embodiment consistent with the present disclosure, parameters of the color type can be directly parsed without being written to the image data intermediate files. Therefore, the disk operation can be reduced, and thus the processing efficiency is increased.

Preferably, the page digital image can be parsed by an image parameter parser to obtain the rasterization information of the image and the rasterization information includes transfer curves. The step of rasterizing includes a step of processing a transfer curve of the converted image data based on the transfer curves of the rasterization information. According to a preferable embodiment consistent with the present disclosure, parameters of transfer curves can be directly parsed without being written to the image data intermediate files. Therefore, the disk operation can be reduced, and thus the processing efficiency is improved.

The step of rasterizing the image data may further include a step of performing a geometric transform of the transfer-curve-processed image data with the position information of the image and a step of setting the transformed image data to the page lattice. The rasterizing process of the image data is done and the rasterized page lattice is generated. According to a preferable embodiment consistent with the present disclosure, the position information of the image can be directly parsed without being written to image data intermediate files. Therefore, the disk operation can be reduced, and thus the processing efficiency is increased.

Preferably, a method consistent with the present disclosure may further include a step of releasing computer sources occupied by the rasterized image data, which can increase the utilization efficiency of the computing device.

Figure 3:
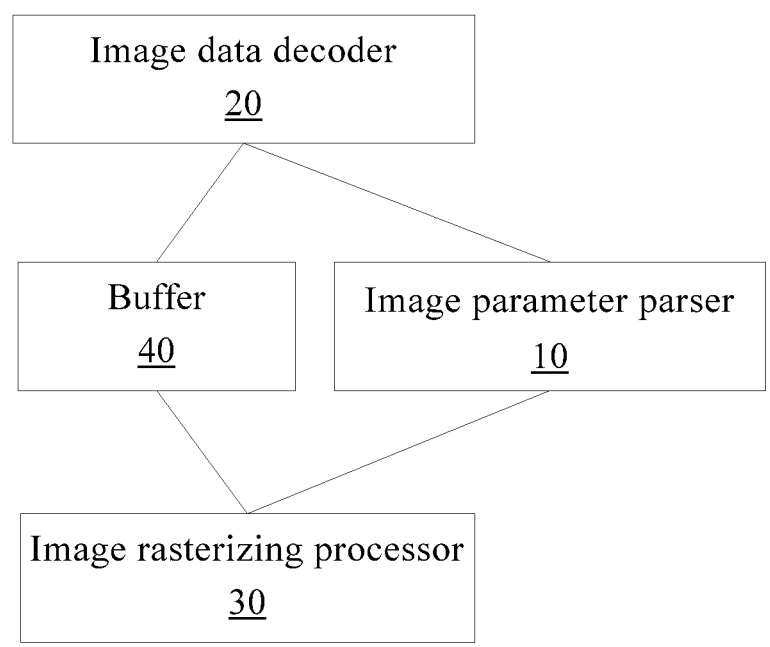
FIG. 3 is a schematic diagram of an apparatus for rasterizing a page digital image according to an embodiment of the present application.

FIG. 3 is a schematic diagram of an apparatus for rasterizing a page digital image according to an embodiment of the present application. The apparatus may include an image parameter parser 10, an image data decoder 20 and an image rasterizing processor 30. The image parameter parser 10 is configured to parse a page digital image to obtain basic information, position information and rasterization information of the image, wherein the basic information includes image data, image type, a width, height and bit depth of the image. The image data decoder 20 is configured to decode data encoding type to obtain the image data and save the image data into a buffer 40. The image rasterizing processor 30 is configured to acquire the image data from the buffer 40 and rasterize the image data by using the image type, the width, height and bit depth of the image and the position information to obtain a rasterized page lattice.

The apparatus can reduce the reading and writing operations to the disk data files during the digital image rasterizing process and substantially increases the efficiency of the digital image rasterizing process.

Preferably, the basic information of the image may further include Decode parameters, and the apparatus may further include a Decode processor configured to perform a Decode process of the image data with the Decode parameters. According to a preferable embodiment consistent with the present disclosure, the efficiency of the rasterizing process can be further increased.

Preferably, the basic information of the image may further include color type, and the apparatus may further include a color processor configured to convert a color space of the Decode-processed image data with the color type. According to a preferable embodiment consistent with the present disclosure, the efficiency of the rasterizing process can be further increased.

Preferably, the image parameter parser may parse the page digital image to obtain the rasterization information of the image, and the rasterization information includes transfer curves. The image rasterizing processor may further include a transfer curve processor configured to process the converted image data with the transfer curves. According to a preferable embodiment consistent with the present disclosure, the efficiency of the rasterizing process will be further increased.

Preferably, the image rasterizing processor may further include a geometric transforming processor configured to transform a geometric of the transfer-curve-processed image data with the position information of the image and set the transformed image data to the page lattice. Accordingly, the rasterizing process of the image data is done and thus the rasterized page lattice is generated. According to a preferable embodiment consistent with the present disclosure, the efficiency of the rasterizing process can be further increased.

Figure 4:
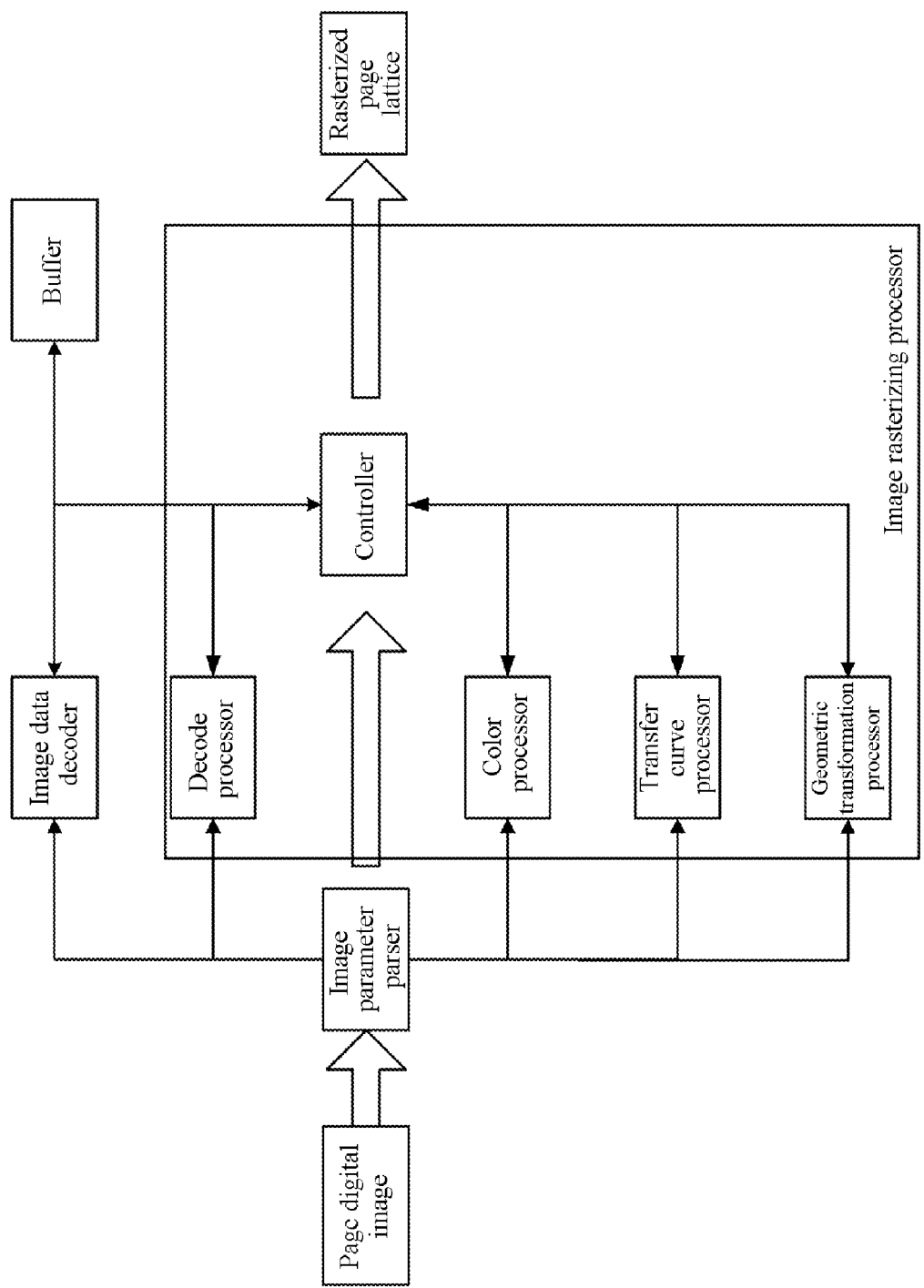
FIG. 4 is a schematic diagram of an apparatus for rasterizing a page digital image according to a preferable embodiment of the present application.

FIG. 4 is a schematic diagram of an apparatus for rasterizing a page digital image according to one preferable embodiment of the present application. The details of the embodiment in FIG. 4 are provided below.

1. First the image parameter parser is configured to parse the page digital image to obtain the basic information, position information and rasterization information of the image.

(1) The basic information may include:

image type, such as ordinary image and Mask image etc.; and the width, height and bit depth of the image, color type, Decode and the data encoding type, all of which may be recorded in page description language of the digital image.

(2) The position information may include:

image transformation matrix defined in the page description language of the digital image and configured to complete the transformation from a user coordinate space to an image coordinate space;

current transformation matrix (CTM) defined in the page description language of the digital image and used to describe graphic state, and configured to complete the transformation from a user coordinate space to a device coordinate space; and image bounding box and coordinates of the image in the page lattice of the output device, which determine the size of the image in the final page lattice.

(3) The rasterization information may include:

transfer curves defined in the page description language of the digital image and used to describe graphic state, and configured to compensate non-linear characteristics of the output device;

halftone function defined in the page description language of the digital image and used to describe graphic state, and configured for image halftone processing (i.e. mesh processing).

2. After the image parameter parser obtains the information related to the digital image, these information need to be sent to each processor for rasterizing the image.

(1) The image type, the width, height and bit depth of the image of the basic information of the image are sent to the image rasterizing processor.

(2) The position information of the image is sent to the image rasterizing processor.

(3) The data encoding type of the basic information is sent to the image data decoder.

(4) The color type of the basic information is sent to the color processor.

(5) The Decode of the basic information is sent to Decode processor.

(6) The transfer curves of the rasterization information of the image are sent to the transfer curve processor.

(7) The halftone function of the rasterization information of the image may not be used in most cases.

3. After the image rasterizing processor acquires the image parameters, it will rasterize the page image to generate the final rasterized page lattice.

(1) The image data decoder of the image rasterizing processor acquires the image data. The data encoding information of the image from the image parameter parser are saved in the image data decoder, and the image data decoder decodes the image data based on the data encoding information.

(2) After the image data have been rasterized, the image data decoder can release the computer source related to the rasterized image data. The image data decoder saves the image data that are not rasterized to the image data buffer.

(3) During the image rasterizing process, the image data buffer can use the computer memory to buffer the image data without reading and writing operations to disk data files. After the buffered image data are processed, the buffer is released.

(4) During the image rasterizing process, to increase the efficiency of the rasterizing process, saving order of the image data in the image data buffer is same as saving order of the image data in the final rasterizing page lattice.

(5) The Decode processor of the image rasterizing processor performs the Decode process on the original image data based on the Decode parameters received from the image parameter parser.

(6) During the image rasterizing process (5), the Decode processing is performed on the original image data.

(7) The color processor of the rasterizing processor converts the color of the image data from the image color space to the device color space according to color type, i.e. type of the color space of the output device. For example, when the color space of the device is CMYK, the image data need to be converted from the color space of the image to CMYK data.

(8) During the image rasterizing process (7), the color type of the Decode-processed image data is converted.

(9) The transfer curve processor of the image rasterizing processor performs the transfer curve processing on the image data according to the transfer curve parameter received from the image parameter parser.

(10) During the image rasterizing process (9), the transfer curve is the parameter defined in the graphic state in the page description language to compensate non-linear characteristics of the output device. The transfer curve refers to the parameter related to the device, and the transfer curve is performed on the color-converted image.

(11) During the image rasterizing process (9), the transfer curve processor should be capable of optimizing the processing, for example, it can particularly process some particular transfer curve transformation such as identity transformation and inverse transformation to increase the efficiency of the whole image rasterizing process.

(12) The image geometric transforming processor of the image rasterizing processor transforms the geometric of the image data according to the position information received from the image parameter parser.

(13) During the image rasterizing process (11), the geometric of the image data, transfer curve of which is processed, is transformed.

(14) During the image rasterizing process (11), the image geometric transforming processor is a pure functional processor configured to process the geometric transforming of the digital image and be independent of a specific individual image.

(16) After the geometric transforming is completed, the image rasterizing processor sets the transformed image data to the page lattice to generate the rasterized page lattice.

(17) After the rasterizing process of the image data is completed, each of the image data decoder, the image data buffer, the Decoder processor, the color processor and the transfer curve processor releases the saved information resource closely related to the digital image to reduce the usage of computer resources. The rasterizing process of the image data is completed.

In view of the above, the methods and the apparatuses according to the embodiments of the present invention apply the rasterizing process of the image data without the image data intermediate files, and may not generate any image data intermediate file or may not need any reading or writing operations to disk data from the digital image parameter parsing and rasterizing to the final page lattice generating. In this regard, the method and the apparatus according to embodiments of the present invention avoid the reading and writing operations to the disk data and substantially increase the efficiency of the digital image rasterizing process.

It will be readily apparent to those skilled in the art that the modules or steps of the present application may be implemented with a common computing device. In addition, the modules or steps of the present application can be concentrated or run in a single computing device or distributed in a network composed of multiple computing devices. Optionally, the modules or steps may be achieved by using codes of the executable program, so that they can be stored in the storage medium, or the plurality of the modules or steps can be fabricated into an individual integrated circuit module. Therefore, the present application is not limited to any particular hardware, software or combination thereof.

The foregoing is only preferred embodiments of the present application, and it is not intended to limit the present application. Moreover, it will be apparent to those skilled in the art that various modifications and variations can be made to the present application. Thus, any modifications, equivalent substitutions, improvements etc. within the spirit and principle of the present application should be included within the scope of protection of the application.

What is claimed is:

1. A method for rasterizing a page digital image comprising:
   parsing a page digital image to obtain basic information, position information and rasterization information thereof, the basic information including image data, image type, a width, height and bit depth of the image;
   decoding the image data based on the image type to obtain a decoded image data;
   saving the decoded image data into a buffer; and
   acquiring the saved image data from the buffer; and
   rasterizing the acquired image data based on the image type, the width, height and bit depth of the image and the position information to obtain a rasterized page lattice for the page digital image.

2. The method according to claim 1, further comprising:
   rotating the image data or changing a scanning order of the image data to be consistent with the rasterized page lattice; and
   saving the rotated image data to the buffer.

3. The method according to claim 1, wherein the basic information of the image further include Decode information, and the step of rasterizing comprises: performing a decode processing of the image data based on the Decode information.

4. The method according to claim 3, wherein the basic information of the image further include color type, and the step of rasterizing further comprises:
   converting color space of the Decode-processed image data with the color type.

5. The method according to claim 4, wherein the page digital image are parsed by an image parameter parser to obtain the rasterization information of the image, and the rasterization information includes transfer curves, the step of rasterizing further comprises:
   performing a transfer curve processing of the converted image data with the transfer curves of the rasterization information.

6. The method according to claim 5, wherein the step of rasterizing further comprises:
   transforming a geometric of the transfer-curve-processed image data with the position information of the image; and
   setting the transformed image data to the page lattice in order to complete the rasterizing process of the image data to generate the rasterized page lattice.

7. The method according to any of claims 1-6, further comprising:
   releasing computer sources occupied by the rasterized image data.

8. An apparatus for rasterizing a page digital image comprising:
   an image parameter parser configured to parse a page digital image to obtain basic information, position information and rasterization information of the image, the basic information including image data, image type, a width, height and bit depth of the image;
   an image data decoder configured to decode the image data based on the image type to obtain a decoded image data and save the decoded image data into a buffer; and
   an image rasterizing processor configured to acquire the saved image data from the buffer and rasterize the image data based on the image type, the width, height and bit depth of the image and the position information to obtain a rasterized page lattice.

9. The apparatus according to claim 8, wherein the basic information of the image further includes Decode information, and the apparatus further comprises:
   a Decode processor configured to perform a Decode process for the image data based on the Decode information.

10. The apparatus according to claim 9, wherein the basic information of the image further comprises color type, and the apparatus further comprises a color processor configured to convert a color space of the Decode-processed image data based on the color type.

11. The apparatus according to claim 10, wherein the image parameter parser parses the page digital image to obtain the rasterization information of the image, and the rasterization information includes transfer curves, the image rasterizing processor further comprises:
   a transfer curve processor configured to process the converted image data with the transfer curves.

12. The apparatus according to claim 11, wherein the image rasterizing processor further comprises:
   a geometric transforming processor configured to transform a geometric of the transfer-curve-processed image data based on the position information of the image and set the transformed image data to the page lattice in order to complete the rasterizing process of the image data to generate the rasterized page lattice.

* * * * *